Nov. 3, 1964   A. K. EDELBERG ETAL   3,154,825
FASTENER WITH SHARP BASE
Filed June 23, 1961

INVENTORS
Jacob S. Kamborian
BY  Alan K. Edelberg
Jacob S. Kamborian Jr.
Albert Gordon ATT'Y

United States Patent Office 3,154,825
Patented Nov. 3, 1964

3,154,825
FASTENER WITH SHARP BASE
Alan K. Edelberg, Chelmsford, Mass., Jacob S. Kamborian, Sr., 133 Forest Ave., West Newton, Mass., and Jacob S. Kamborian, Jr., 49 Fay Lane, Needham Heights 94, Mass.; said Edelberg assignor to said Kamborian, Sr.
Filed June 23, 1961, Ser. No. 119,082
4 Claims. (Cl. 24—73)

This application is a continuation-in-part of application Serial No. 80,176 filed January 3, 1961 which has matured into Patent No. 3,112,563. The parent application discloses a method of inserting a fastener into a panel by swinging the fastener about the axis of its shank and imparting such relative movement to the swinging fastener and the panel as to cause the base of the fastener to cut its way through a surface of the panel and embed itself in the interior of the panel.

The object of this invention is to provide an improved fastener that may be used in the above described method. The fastener has a rigid, inflexible, planar base that has at least a portion of its periphery sharpened and lying in a circle whose center of curvature coincides with the axis of fastener shank, the shank having a center line that is at right angles to the plane of the base. With this structure, the sharpened edge is presented substantially continuously to the panel during the period that the fastener is cutting its way into the base, and the planar base permits the penetration of the fastener into the panel with a minimum of resistance.

Reference is now made to the accompanying drawing wherein.

Figure 1:
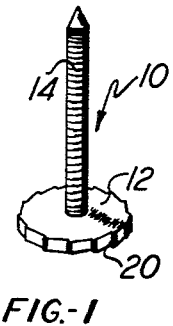
FIG. 1 is a perspective view of one type of fastener.
Figure 2:
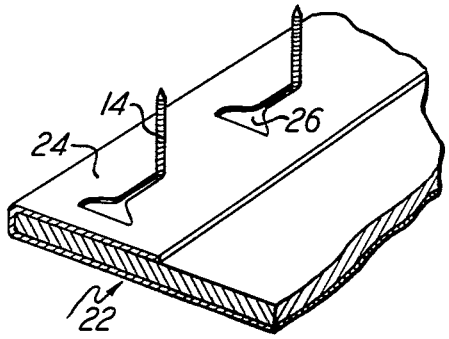
FIG. 2 is a perspective view of the panel with a pair of fasteners embedded therein.
Figure 3:
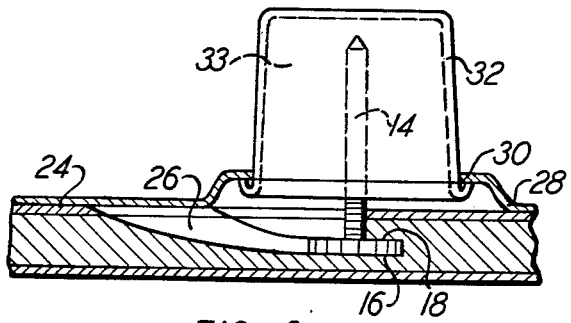
FIG. 3 is a section showing a panel and door frame connected by the fastener of FIG. 1.

Referring to FIGS. 1 through 3 wherein one species of the invention is shown, the fastener 10 is a one-piece integral member comprising a base 12 and a shank 14. The base is rigid and inflexible, is substantially planar and has parallel faces 16 and 18. The periphery of the base is serrated to form a series of sharp edges 20 which lie on a circle whose center of curvature coincides with the center of mass of the base. The axis of the shank 14 is at right angles to plane of the base and lies on the center of curvature of the circle formed by the edges 20.

As aforesaid, the fastener is used to practice the method disclosed in the aforementioned Patent No. 3,112,563. In accordance with this method, a plurality of the fasteners are inserted into a panel 22 by rotating each fastener about the axis of the shank 14 and imparting such relative movement to the panel and fastener as to cause the head 12 to intersect the surface 24 of the panel and then move in a curved path into the panel to the final position shown in FIG. 3. During this movement, the edges 20 serve as cutting teeth to enable the fastener to cut its way into the panel and the portion of the shank 14 adjacent the base tears its way through the panel material. The relative movement of the fastener and panel causes the fastener to cut an undercut slot 26 in the panel with the fastener coming to rest at the end of the slot with the base embedded in the panel and the shank projecting away from the panel.

The fasteners are used to connect the panel to the frame 28 of an automobile door. As shown in FIG. 3, the frame 28 is provided with offsets 30 having elongate openings that receive bushings 32 usually made of nylon and the bushings have elongate recesses 33. The panel 22 is connected to the door frame 28 by juxtaposing the panel and frame with the fasteners and bushings in alignment and pressing the bushings onto the fastener shanks 14.

Figure 5:
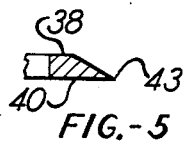
FIG. 5 is a section taken along the line 5—5 of FIG. 4.
Figure 4:
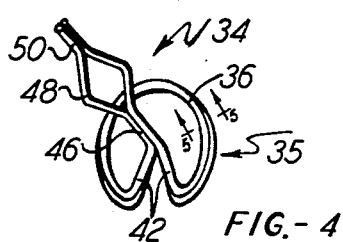
FIG. 4 is a perspective view of a second type of fastener.
Figure 6:
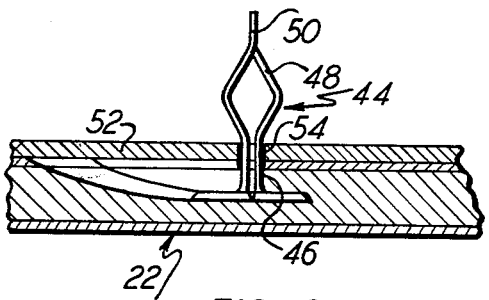
FIG. 6 is a section showing a panel and door frame connected by the fastener of FIG. 4.

The species of fastener 34 shown in FIGS. 4 through 6 comprises a single strand of flexible metal wire. The mid-portion of the strand is formed into a base 35 comprising a curved section 36 and a pair of radial legs 42, the section 36 and the legs 42 lying in a common plane. The section 36, which is rigid and inflexible, lies on a circle and extends most of the way about the circle. The legs 42 extend from the ends of the section 36 radially inwardly of the circle. The section 36 has parallel faces 38 and 40, and the face 38 is bevelled to form a sharp edge 43 extending about the periphery of the section 36. The inner ends of the legs 42 are disposed approximately at the center of the circle on which the section 36 lies and a shank 44 extends away from the inner ends of the legs 42. The shank comprises a pair of limbs that each have a straight section 46 that extends away from the inner end of a leg 42 in a direction normal to the plane of the base, an outwardly bowed section 48 extending away from the section 46 and a straight section 50 extending away from the section 48. The sections 46 and 50 are parallel and the sections 48 are bowed away from each other. The center line of the shank 44 coincides with the center of curvature of the sharp edge 43 and is at right angles to the plane of the base 35.

The fasteners 34 are inserted into the panel 22 in substantially the same manner as the fasteners 10. Each fastener is rotated about the axis of its shank 44 and relative movement between the fastener and panel is created to cause the fastener to intersect the panel in a path similar to that described above for the fastener 10, with the base of the fastener embedded in the panel 22 and the shank projecting outwardly of the panel. During this relative movement the edge 42 cuts its way into the panel and the shank sections 46 tear their way through the panel material.

After the fasteners 34 have been embedded in the panel, the panel is connected to a door frame 52 by juxtaposing the panel and frame with the fasteners 34 and holes 54 in the frame in alignment and moving the panel and frame toward each other. This movement causes the fastener sections 50 to enter a hole 54, followed by an inward deflection of the fastener sections 48 as they enter the hole 54 and by an outward deflection of the sections 48 as they pass the hole 54, so that the frame 52 is held against the panel 22 by the fastener sections 48 as indicated in FIG. 6.

It should be understood that the present disclosure is for the purpose of illustration only and that this invention includes all modifications and equivalents which fall within the scope of the appended claims.

We claim:

1. A fastener comprising: a strand of wire having a portion formed into a rigid, inflexible planar base, the base comprising an arcuate section that lies on a circle and a leg extending inwardly from an end of the arcuate section; cutting means comprising at least one sharp edge formed on substantially all of the outer periphery of the arcuate section; and a shank section extending away from the inner end of the leg, the center line of the shank section coinciding with the center of curvature of the circle and being disposed in a direction at right angles to the plane of the base.

2. A fastener comprising: a strand of wire whose midsection is formed into a rigid, inflexible planar base, the base comprising an arcuate section that lies on a circle and a leg extending inwardly from each end of the arcuate section; cutting means comprising at least one sharp edge formed on substantially all of the outer periphery of the arcuate section; and a shank section extending away from the inner end of each leg, the center line of the shank sections coinciding with the center of curvature of the circle and being disposed in a direction at right angles to the plane of the base.

3. A fastener comprising: a strand of wire whose midsection is formed into a rigid, inflexible planar base, the base comprising an arcuate section that lies on a circle and a leg extending inwardly from each end of the arcuate section to the center of curvature of the circle; said arcuate section having parallel faces and a bevel on the outer periphery of one of said faces that forms a sharp edge with the outer periphery of the other of said faces; and a shank section extending away from the inner end of each leg, the center line of the shank sections coinciding with the center of curvature of the circle and being disposed at right angles to the plane of the base.

4. A fastener comprising: a strand of wire having a portion formed into a rigid, inflexible arcuate planar base section that lies on a circle; cutting means comprising at least one sharp edge formed on substantially all of the outer periphery of the base section; and a shank section connected to the base section having a center line that coincides with the center of curvature of the arcuate base section and that is disposed at right angles to the plane of the base section.

References Cited in the file of this patent

UNITED STATES PATENTS

| | | |
|---|---|---|
| 340,692 | Bailey | Apr. 27, 1886 |
| 793,123 | Carroll | June 27, 1905 |
| 943,520 | Cornell | Dec. 14, 1909 |
| 1,679,266 | Place | July 31, 1928 |
| 1,693,875 | Tanaka | Dec. 4, 1928 |
| 2,058,320 | Jones | Oct. 20, 1936 |
| 2,097,641 | Place | Nov. 2, 1937 |
| 2,163,455 | Van Uum | June 20, 1939 |
| 2,259,186 | Swedman | Oct. 14, 1941 |
| 2,799,899 | Chadwick | July 23, 1957 |

FOREIGN PATENTS

| | | |
|---|---|---|
| 504,900 | Great Britain | May 2, 1939 |
| 22,490 | Switzerland | of 1900 |